(12) United States Patent
Charles et al.

(10) Patent No.: US 11,876,864 B1
(45) Date of Patent: Jan. 16, 2024

(54) USING PREDICTIVE ANALYTICS ON SFP METRICS TO INFLUENCE THE TARGET PORT SELECTION PROCESS

(71) Applicant: Dell Products L.P., Hopkinton, MA (US)

(72) Inventors: Peniel Charles, Bangalore (IN); Manikandan Sethuraman, Bangalore (IN); Owen Crowley, Carrigaline (IE)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/168,009

(22) Filed: Feb. 13, 2023

(51) Int. Cl.
*H04L 67/1097* (2022.01)
*H04L 43/0823* (2022.01)
*H04L 67/1008* (2022.01)

(52) U.S. Cl.
CPC ...... *H04L 67/1097* (2013.01); *H04L 43/0823* (2013.01); *H04L 67/1008* (2013.01)

(58) Field of Classification Search
CPC ............. H04L 67/1097; H04L 43/0823; H04L 67/1008
USPC ......................................................... 709/203
See application file for complete search history.

(56) References Cited

U.S. PATENT DOCUMENTS

| | | | | |
|---|---|---|---|---|
| 8,984,220 B1* | 3/2015 | Gill | ......................... | G06F 3/067 711/100 |
| 9,058,119 B1* | 6/2015 | Ray, III | .................. | H04L 12/00 |
| 11,457,294 B1* | 9/2022 | Mahdi Hayder | .... | H04B 10/071 |
| 11,588,686 B2* | 2/2023 | Cagle | ..................... | H04L 49/205 |
| 11,693,577 B2* | 7/2023 | Veluswamy | ............ | G06F 3/067 711/154 |
| 2001/0056359 A1* | 12/2001 | Abreu | .................. | A61B 5/4848 705/3 |
| 2007/0269217 A1* | 11/2007 | Yu | .......................... | H04B 10/40 398/137 |
| 2008/0301333 A1* | 12/2008 | Butler | ................. | H04L 67/1023 710/38 |
| 2010/0027991 A1* | 2/2010 | Hosking | ................ | H04B 10/07 398/9 |
| 2010/0054733 A1* | 3/2010 | Hosking | ................ | H04B 10/40 398/25 |
| 2011/0088096 A1* | 4/2011 | Hilton | .................... | G06F 21/105 380/278 |
| 2011/0217009 A1* | 9/2011 | Burrell | ...................... | G02B 6/36 385/92 |
| 2011/0305454 A1* | 12/2011 | Hsieh | ...................... | H04B 10/40 398/25 |
| 2013/0212200 A1* | 8/2013 | Dennis | ................ | H04L 67/1095 709/206 |

(Continued)

*Primary Examiner* — Sargon N Nano
(74) *Attorney, Agent, or Firm* — Anderson Gorecki LLP

(57) ABSTRACT

The condition of SFP transceivers of RDF port pairs is monitored and used to project port pair data transmission rate degradation. Responsive to receipt of a command to migrate data from a source volume to a target volume, ability of port pairs to accommodate the additional load associated with data migration is calculated based on projected data transmission rate and normal load. Only port pairs that are capable of accommodating the additional load in view of the condition of the SFP transceivers are considered as candidates. Utilization of the source volume is monitored and the target volume is created with a size based on projected growth of utilization of the source volume.

20 Claims, 6 Drawing Sheets

(56) References Cited

U.S. PATENT DOCUMENTS

| | | | |
|---|---|---|---|
| 2014/0223046 A1* | 8/2014 | Liu | G06F 3/0655 |
| | | | 710/74 |
| 2014/0248794 A1* | 9/2014 | Khazen | G02B 6/4277 |
| | | | 439/535 |
| 2016/0094298 A1* | 3/2016 | Isfeldt | H04B 13/02 |
| | | | 398/104 |
| 2019/0170951 A1* | 6/2019 | Funada | G02B 6/424 |
| 2020/0084907 A1* | 3/2020 | Norton | G06F 13/4081 |
| 2020/0319976 A1* | 10/2020 | Shu | G06F 11/1453 |
| 2021/0132850 A1* | 5/2021 | Wang | G06F 3/0652 |
| 2022/0038363 A1* | 2/2022 | Subramanian | H04L 43/16 |
| 2022/0214980 A1* | 7/2022 | Tanaka | H04B 10/278 |
| 2022/0286221 A1* | 9/2022 | Magri | H04J 14/0257 |
| 2023/0121646 A1* | 4/2023 | Veluswamy | G06F 3/067 |
| | | | 711/154 |

* cited by examiner

USING PREDICTIVE ANALYTICS ON SFP METRICS TO INFLUENCE THE TARGET PORT SELECTION PROCESS

TECHNICAL FIELD

The subject matter of this disclosure is generally related to data storage systems.

BACKGROUND

A typical data center includes storage nodes that support clusters of host servers. Instances of host applications run on the host servers. Examples of host applications include software for email, e-business, accounting, inventory control, manufacturing control, and engineering. Host application data is maintained by the storage nodes. Examples of storage nodes include storage area networks (SANs), storage arrays, network-attached storage (NAS) servers, and converged direct-attached storage (DAS). Migration of host application data between storage nodes may be necessary or desirable for various reasons, possibly including, but not limited to, load balancing, maintenance, and replacement of equipment. Currently, data migrations are manually planned.

SUMMARY

A method in accordance with some implementations comprises: monitoring condition of optical transceivers at ports of a first data storage node; monitoring condition of optical transceivers at ports of a second data storage node, ones of the ports of the first data storage node being connected to ones of the ports of the second data storage node as port pairs; and responsive to a command to migrate data from a source volume of the first data storage node to a target volume of the second data storage node: selecting one of the port pairs for transmission of the data based on the condition of the optical transceivers of the ports of the port pair; and migrating the data via the selected port pair.

An apparatus in accordance with some implementations comprises: a migration source storage system with a first workload planner configured to monitor condition of optical transceivers at ports of a first data storage node; a migration target storage system with a second workload planner configured to monitor condition of optical transceivers at ports of a second data storage node, ones of the ports of the first data storage node being connected to ones of the ports of the second data storage node as port pairs; and a management program configured, responsive to a command to migrate data from a source volume of the first data storage node to a target volume of the second data storage node, to: select one of the port pairs for transmission of the data based on the condition of the optical transceivers of the ports of the port pair; and prompt migration of the data via the selected port pair.

In accordance with some implementations, a non-transitory computer-readable storage medium stores instructions that when executed by a storage system cause the storage system to perform a method comprising: monitoring condition of optical transceivers at ports of a first data storage node; monitoring condition of optical transceivers at ports of a second data storage node, ones of the ports of the first data storage node being connected to ones of the ports of the second data storage node as port pairs; and responsive to a command to migrate data from a source volume of the first data storage node to a target volume of the second data storage node: selecting one of the port pairs for transmission of the data based on the condition of the optical transceivers of the ports of the port pair; and migrating the data via the selected port pair.

This summary is not intended to limit the scope of the claims or the disclosure. Other aspects, features, and implementations will become apparent in view of the detailed description and figures, and all the examples, aspects, implementations, and features can be combined in any technically possible way.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
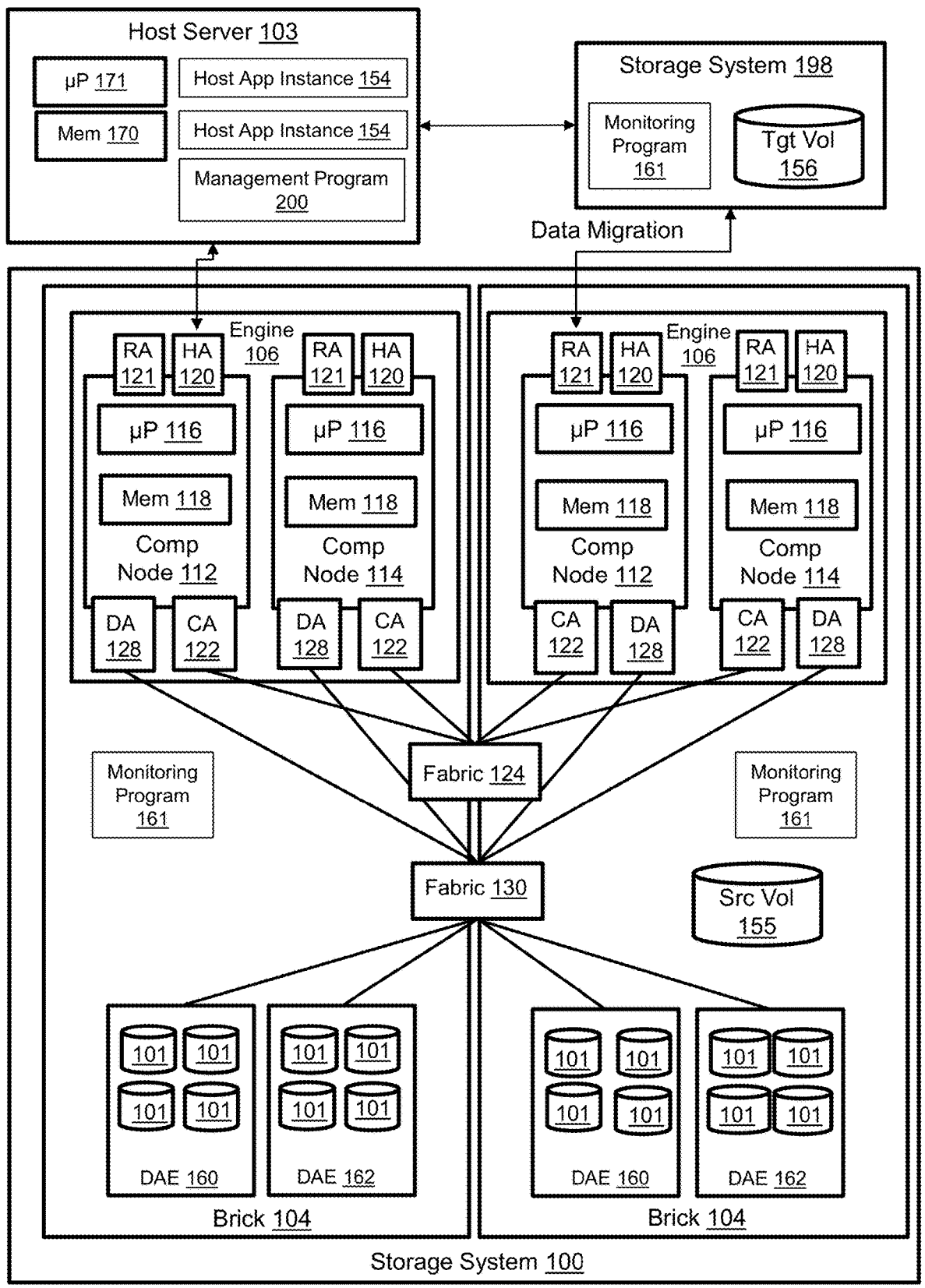
FIG. 1 illustrates a simplified data center environment with a host server and storage arrays for which port pairs are selected for data migration based on the condition of SFP transceivers.

FIG. 1 illustrates a simplified data center environment with two storage systems 100, 198 and a host server 103. The host server runs a management program 200 that automates selection of port pairs for use when migrating data from a source volume 155 to a target volume 156. More specifically, the port pairs are selected based on the condition of small form-factor pluggable (SFP) transceivers that are used in the ports. Storage system 100 and storage system 198 may be any type of storage systems, including, but not limited to, storage arrays, SANs, NAS, and converged DAS. The host server 103, of which there may be many, includes volatile memory 170 and one or more tangible processors 171. The memory and processors are used to run host application instances 154. The host application instances may run on virtual machines under a hypervisor or in containers. Instances of host applications prompt generation of input-output commands (IOs) to read and/or write host application data that is maintained by storage system 100.

Storage system 100 is specifically depicted as a storage array. A storage array includes one or more bricks 104. Each brick includes an engine 106 and one or more disk array enclosures (DAEs) 160, 162. Each engine 106 includes a pair of interconnected compute nodes 112, 114 that are arranged in a failover relationship and may be referred to as "storage directors." Although it is known in the art to refer to the compute nodes of a storage array or SAN as "hosts," that naming convention is avoided in this disclosure to help distinguish the host server 103 from the compute nodes 112, 114. Nevertheless, the host applications could run on the compute nodes. Each compute node includes hardware resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory to a shared memory that can be accessed by all compute nodes of the storage array. Each compute node includes one or more front-end host adapters (HAs) 120 for communicating with host servers. Each host adapter has resources for servicing input-output commands (IOs) from the host servers. The host adapter resources may include processors, volatile memory, and ports via which the hosts may access the storage array. Each compute node also includes a front-end remote adapter (RA) 121 with Remote Data Forwarding (RDF) ports for communicating with other storage systems such as storage system 198, e.g., for data replication and data migration. Each compute node also includes one or more back-end disk adapters (DAs) 128 for communicating with managed drives 101 in the DAEs 160, 162. Each disk adapter has processors, volatile memory, and ports via which the compute node may access the DAEs for servicing IOs. Each compute node may also include one or more back-end channel adapters (CAs) 122 for communicating with other compute nodes via an interconnecting fabric 124. The managed drives 101 include non-volatile storage media that may be of any type, e.g., including one or more types such as solid-state drives (SSDs) based on EEPROM technology such as NAND and NOR flash memory and hard disk drives (HDDs) with spinning disk magnetic storage media. Disk controllers may be associated with the managed drives as is known in the art. An interconnecting fabric 130 enables implementation of an N-way active-active backend. A backend connection group includes all disk adapters that can access the same drive or drives. In some implementations, every disk adapter 128 in the storage array can reach every DAE via the fabric 130. Further, in some implementations every disk adapter in the storage array can access every managed disk 101.

Host application data is maintained on the managed drives 101. Because the managed drives are not discoverable by the host servers, the storage array creates logical storage objects such as source volume 155 that can be discovered by the host servers. Without limitation, storage objects may be referred to as volumes, devices, or LUNs, where a logical unit number (LUN) is a number used to identify logical storage volumes in accordance with the small computer system interface (SCSI) protocol. From the perspective of the host servers, each production storage object is a single disk having a set of contiguous fixed-size logical block addresses (LBAs) on which data used by the instances of a host application resides. However, the host application data is stored at non-contiguous addresses on various managed drives 101. Separate storage groups of production storage objects may be created for each host application. Consequently, storage groups can be used to represent host applications in workload and storage capacity utilization calculations. The compute nodes 112, 114 maintain metadata that maps between the LBAs of the production storage objects and physical addresses on the managed drives 101 in order to process IOs from the host application instances.

Figure 2:
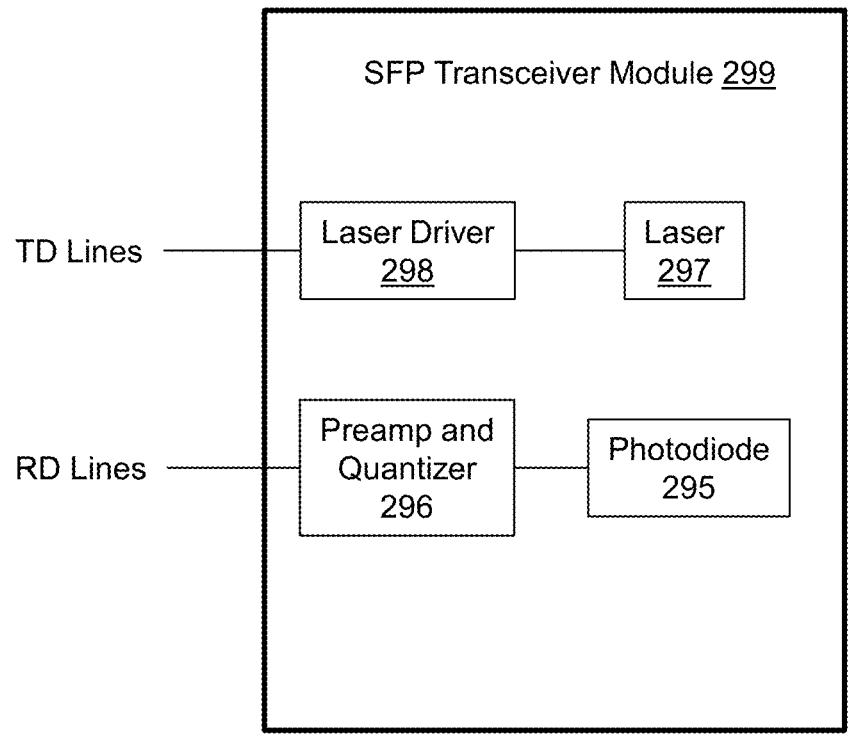
FIG. 2 illustrates an SFP transceiver module.

Referring to FIGS. 1 and 2, the RDF ports of the remote adapters 121 include SFP transceivers such as SFP transceiver module 299. Transmit lines are connected to a laser driver 298 that modulates a laser 297 to transmit signals over optical fiber. Receive lines are connected to a preamp and quantizer 296 and photodiode for receiving optical signals that are converted to electrical signals. In order to migrate the data stored on source volume 155 from storage system 100 to storage system 198, a target volume 156 is created on storage system 198. The data is then written from the source volume 155 to the target volume 198 via optical signals sent and received with the RDF ports. However, the IOs associated with writing the data may present a significant change in loading on both storage systems 100, 198, each of which may have RDF ports with SFP transceivers in various states of degradation. Over a period of time, e.g., two years, the optical signal strength of which an SFP transmitter is capable degrades until it is so weak that the SFP module is considered failed. As the optical signal strength decreases over time, the data transmission rate capability of the SFP and thus the port pair declines. Data migration requires bi-directional communication between storage systems, so the condition of SFP transceivers of both the migration source and migration target have an effect on data transmission rate. In order to facilitate efficient and non-disruptive migration of the data, the management program 200 calculates projected port pair loading and potential data transmission rate based on the condition of the SFP transceivers of each port pair. Only port pairs that are capable of handling the increased load of data migration in view of their condition are selected.

Figure 3:
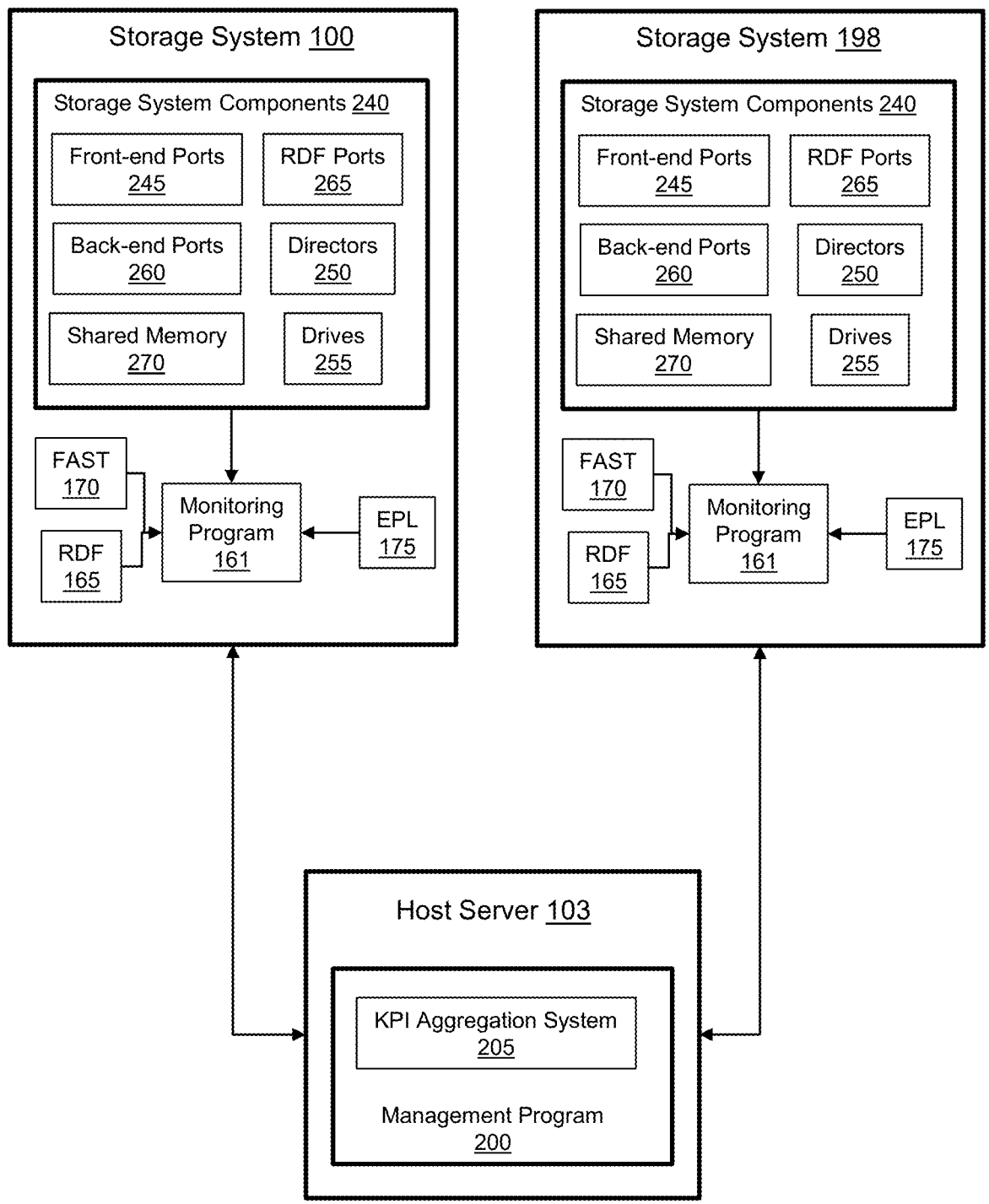
FIGS. 3 and 4 illustrate monitoring and prediction of SFP transceiver degradation.

Referring to FIG. 3, monitoring programs 161 running on the storage systems 100, 198 gather performance data from storage system hardware components 240 possibly including, but not limited to, front-end ports 245, directors 250, drives 255, back-end ports 260, RDF ports 265, and shared memory 270. The performance monitoring programs also gather current utilization and performance data from software system components such as Fully Automated Storage Tiering (FAST) processes 170, RDF processes 165, and an essential performance library (EPL) 175. The RDF utilization and performance data includes an indication of the condition of the SFPs, e.g., in terms of remaining lifespan, signal strength, or both.

Management program 200 includes a Key Performance Indicator (KPI) aggregation system 205 that uses the current utilization and performance data to create performance characterizations of the storage system components 240, including the SFPs. The performance characterizations may be represented by component KPI data structures. The KPI aggregation system 205 distills reported current utilization and performance data from the monitoring programs 161 into sets of 42 four-hour buckets, in which each bucket contains a weighted average KPI value for the respective four-hour interval. Using 42 four-hour interval buckets enables the KPI aggregation system 205 to characterize the fluctuation of a given KPI value over the course of a week, which may be a suitable period of time for characterization of time-varying load patterns. Additional information regarding the KPI aggregation system 205 is described in U.S. Pat. No. 11,294,584, entitled Method and Apparatus for Automatically Resolving Headroom and Service Level Compliance Discrepancies, the content of which is hereby incorporated herein by reference.

Figure 4:
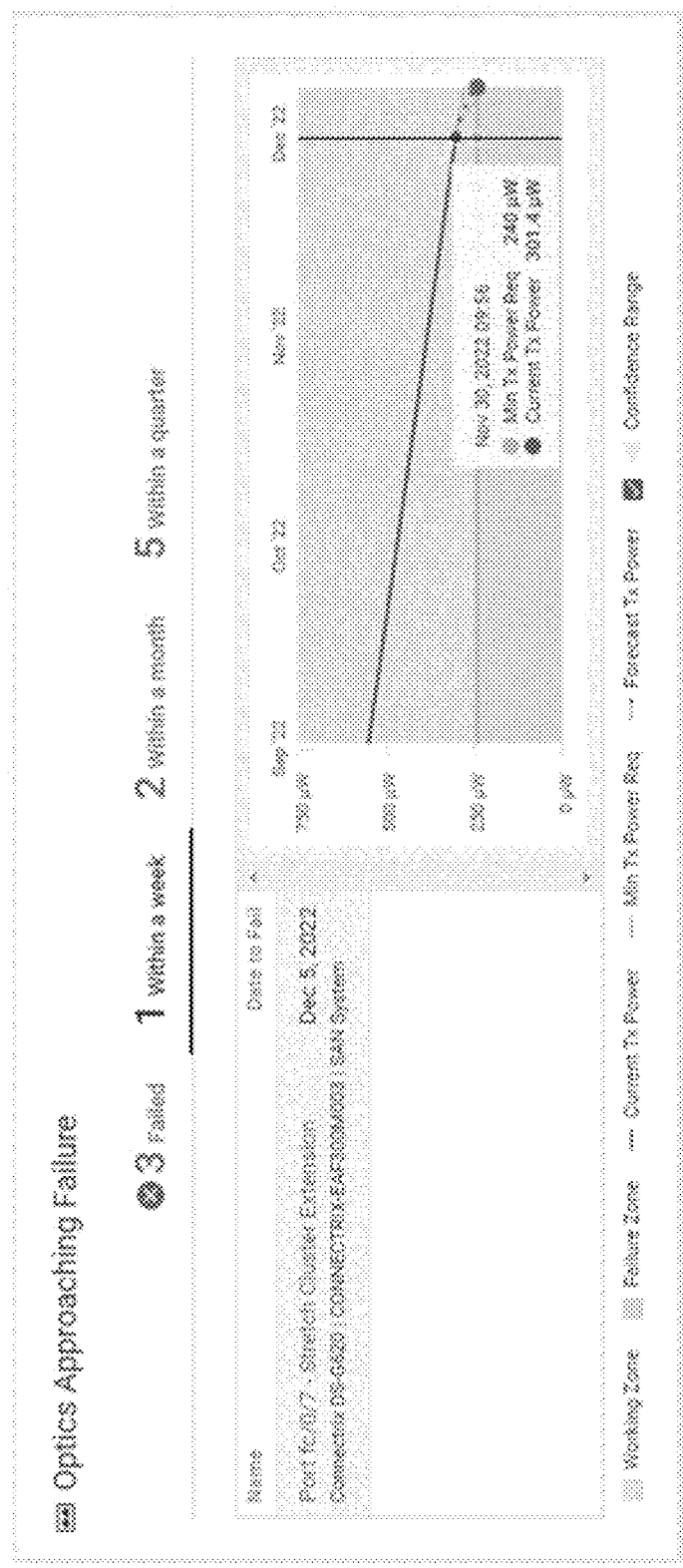

FIG. 4 illustrates a graphical representation of monitored and predicted condition of an SFP transceiver in terms of optical output power. The graphical representation is generated using predictive analytics with the KPIs as mentioned above. Based on the time window at which the data migration is planned to happen, the projected condition of the SFP transceivers of all port pairs during migration of data between the storage systems is determined. A maximum data transmission rate for the SFP transceivers of a port pair is calculated based on the projected condition of the SFP transceivers. The calculated maximum data transmission rate is compared with the projected load on the port pair during the time window to determine whether the port pair is capable of handling the additional load associated with data migration.

Figure 5:
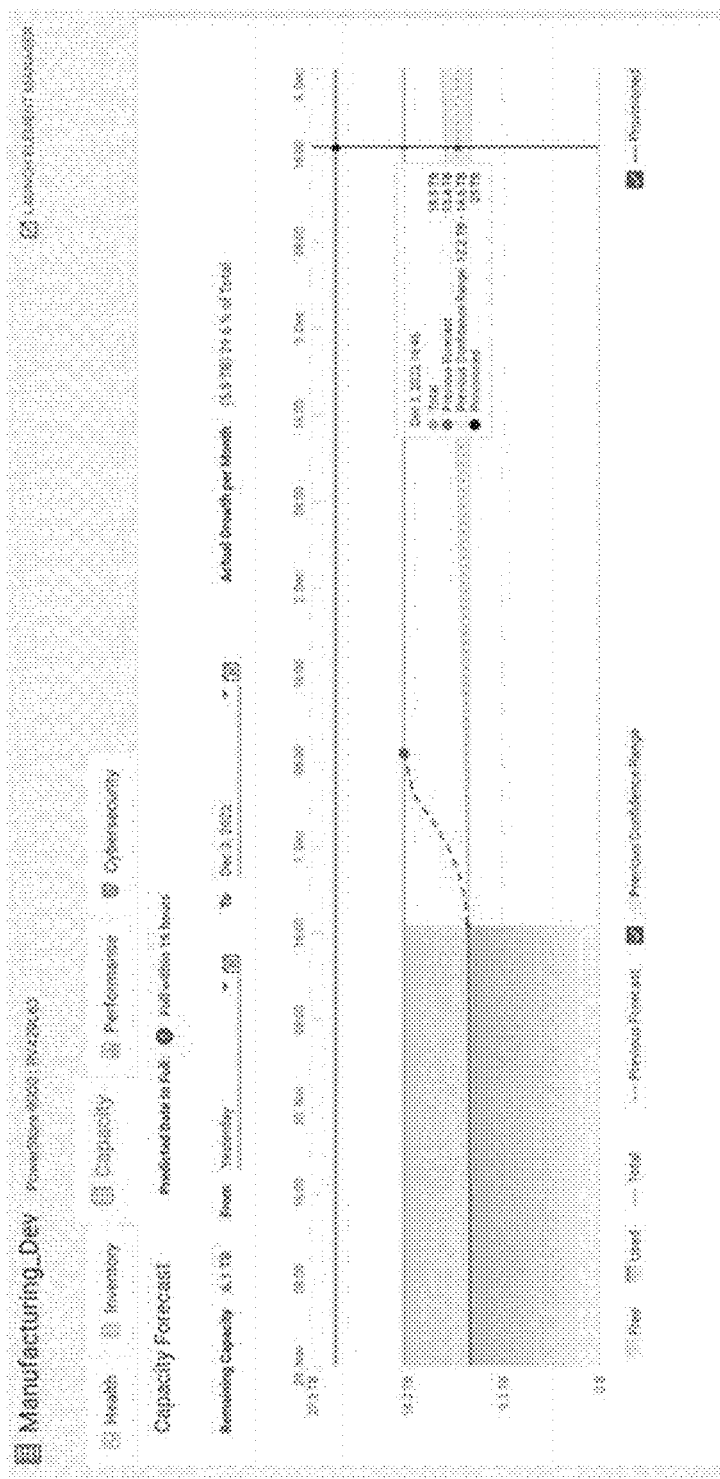
FIG. 5 illustrates monitoring and prediction of source volume utilization.

FIG. 5 illustrates monitoring and prediction of source volume utilization. The source volume is created with a fixed storage capacity. Although the source volume may be thinly provisioned, the range of LBAs is static. Over time, utilization of the fixed storage capacity tends to increase as more data is written to the volume than is deleted. Utilization, which is the amount of storage capacity in use relative to the total storage capacity, is monitored and the predictive analytics are used to calculate projected utilization of the source volume over time. If the projected utilization of a source volume being migrated is greater than a predetermined threshold, e.g., 75%, at the time of migration, then the target volume is created with a larger size than the source volume. Otherwise, the target volume is created with the same storage capacity as the source volume. It was previously standard practice to generate the target volume with the same size as the source volume under all circumstances.

Figure 6:
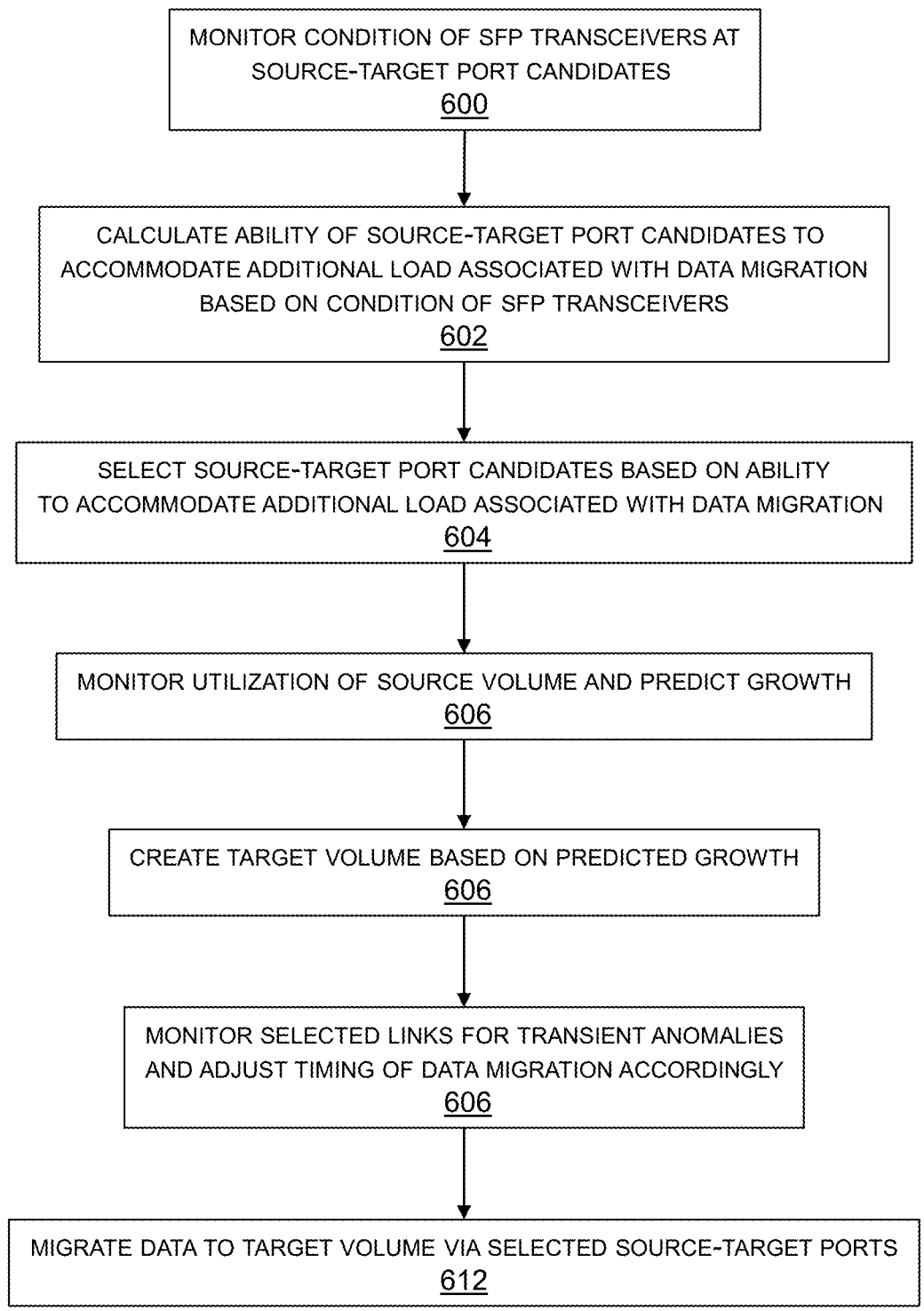
FIG. 6 illustrates a method in accordance with aspect of the presently disclosed invention.

FIG. 6 illustrates a method in accordance with aspects of the presently disclosed invention. The condition of SFP transceivers at port pair candidates is monitored as indicated in step 600. Each port pair includes a source RDF port at the storage system on which the source volume is maintained and a target RDF port at the storage system on which the target volume is maintained, and each RDF port includes SFP transceivers. Step 602 is calculating the ability of candidate port pairs to accommodate additional load associated with data migration based on the condition of the SFP transceivers. The projected load and projected additional load are calculated from prior load patterns and source volume size and utilization. The data transmission rate necessary to support the projected load and projected additional load are calculated and compared with the data transmission rate of which the candidate port pair are capable in view of their projected condition at the time window during which the migration is planned. Step 604 is selecting one or more port pair candidates based on the calculated capabilities of supporting the projected load and projected additional load. It will be apparent in view of the present disclosure that a first port pair that is less heavily loaded than a second port pair in terms of IOPS may be less capable of handling the projected additional load of data migration due to having more degraded SFP transceivers that have a lower data transmission rate ceiling. The candidate port pair having the greatest projected additional load capability may be selected in some implementations, while in other implementations any port pair having sufficient projected additional load capability may be selected. Step 606 is monitoring utilization of the source volume and predicting utilization growth over time. Step 608 is creating a target volume based on the predicted utilization at the time of migration. A threshold utilization may be predetermined for changing the storage capacity of the target volume relative to the source volume based on predicted utilization relative to capacity. For example, the target volume may be created such that the target volume will have no greater than 50% utilization when migration is completed. Step 606 is monitoring the links associated with the selected port pair for transient anomalies and adjusting the timing of the migration if necessary. If loading, SFP condition, or other monitored metrics differ significantly from projected values just prior to the time at which migration is scheduled to commence, the migration may be rescheduled if the differences are such that the migration would no longer be expected to be completed within the planned time window. Step 612 is migrating the data from the source volume to the target volume via the selected link and port pair.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:
    monitoring condition of optical transceivers at ports of a first data storage node, where the condition comprises at least one of remaining lifespan and signal strength;
    monitoring condition of optical transceivers at ports of a second data storage node, where the condition comprises at least one of remaining lifespan and signal strength, ones of the ports of the first data storage node being connected to ones of the ports of the second data storage node as port pairs; and
    responsive to a command to migrate data from a source volume of the first data storage node to a target volume of the second data storage node in a future time window:
        projecting the condition of the optical transceivers during data migration;

selecting one of the port pairs for transmission of the data based on the projected conditions of the optical transceivers of the ports of the port pair; and migrating the data via the selected port pair.

2. The method of claim 1 further comprising calculating data transmission rate capability of the port pairs based on the projected condition of the optical transceivers of the ports of the port pair.

3. The method of claim 2 further comprising calculating ability of the port pairs to accommodate additional load associated with migration of the data based on the calculated data transmission rate capability.

4. The method of claim 1 further comprising monitoring utilization of the source volume.

5. The method of claim 4 further comprising calculating projected growth of utilization of the source volume over time.

6. The method of claim 5 further comprising calculating a size of the target volume based on the projected growth of utilization of the source volume and creating the target volume with the calculated size.

7. The method of claim 1 further comprising monitoring the port pairs for transient anomalies and adjusting timing of migration of the data based on detected transient anomalies.

8. An apparatus comprising:
a migration source storage system with a first workload planner configured to monitor condition of optical transceivers at ports of a first data storage node, where the condition comprises at least one of remaining lifespan and signal strength;
a migration target storage system with a second workload planner configured to monitor condition of optical transceivers at ports of a second data storage node, where the condition comprises at least one of remaining lifespan and signal strength, ones of the ports of the first data storage node being connected to ones of the ports of the second data storage node as port pairs; and
a management program configured, responsive to a command to migrate data from a source volume of the first data storage node to a target volume of the second data storage node in a future time window, to:
project the condition of the optical transceivers during data migration;
select one of the port pairs for transmission of the data based on the projected conditions of the optical transceivers of the ports of the port pair; and
prompt migration of the data via the selected port pair.

9. The apparatus of claim 8 further comprising the management program configured to calculate data transmission rate capability of the port pairs based on the projected condition of the optical transceivers of the ports of the port pair.

10. The apparatus of claim 9 further comprising the management program configured to calculate ability of the port pairs to accommodate additional load associated with migration of the data based on the calculated data transmission rate capability.

11. The apparatus of claim 8 further comprising the management program configured to monitor utilization of the source volume.

12. The apparatus of claim 11 further comprising the management program configured to calculate projected growth of utilization of the source volume over time.

13. The apparatus of claim 12 further comprising the management program configured to calculate a size of the target volume based on the projected growth of utilization of the source volume and create the target volume with the calculated size.

14. The apparatus of claim 8 further comprising the management program configured to monitor the port pairs for transient anomalies and adjust timing of migration of the data based on detected transient anomalies.

15. A non-transitory computer-readable storage medium storing instructions that when executed by a storage system cause the storage system to perform a method comprising:
monitoring condition of optical transceivers at ports of a first data storage node, where the condition comprises at least one of remaining lifespan and signal strength;
monitoring condition of optical transceivers at ports of a second data storage node, where the condition comprises at least one of remaining lifespan and signal strength, ones of the ports of the first data storage node being connected to ones of the ports of the second data storage node as port pairs; and
responsive to a command to migrate data from a source volume of the first data storage node to a target volume of the second data storage node in a future time window:
projecting the condition of the optical transceivers during data migration;
selecting one of the port pairs for transmission of the data based on the projected conditions of the optical transceivers of the ports of the port pair; and
migrating the data via the selected port pair.

16. The non-transitory computer-readable storage medium of claim 15 in which the method further comprises calculating data transmission rate capability of the port pairs based on the projected condition of the optical transceivers of the ports of the port pair.

17. The non-transitory computer-readable storage medium of claim 16 in which the method further comprises calculating ability of the port pairs to accommodate additional load associated with migration of the data based on the calculated data transmission rate capability.

18. The non-transitory computer-readable storage medium of claim 15 in which the method further comprises monitoring utilization of the source volume.

19. The non-transitory computer-readable storage medium of claim 18 in which the method further comprises calculating projected growth of utilization of the source volume over time.

20. The non-transitory computer-readable storage medium of claim 19 in which the method further comprises calculating a size of the target volume based on the projected growth of utilization of the source volume and creating the target volume with the calculated size.

* * * * *